June 29, 1965   R. P. GIBBENS   3,191,486
AUTOMATIC TORQUE INDICATING AND APPLYING DEVICES
Filed Oct. 29, 1962   2 Sheets-Sheet 1

INVENTOR
ROY P. GIBBENS
BY Michael A. Sileo, Jr.
ATTORNEY

June 29, 1965    R. P. GIBBENS    3,191,486
AUTOMATIC TORQUE INDICATING AND APPLYING DEVICES
Filed Oct. 29, 1962    2 Sheets-Sheet 2

INVENTOR.
ROY P. GIBBENS
BY *Michael A. Silec, Jr.*
ATTORNEY

United States Patent Office 3,191,486
Patented June 29, 1965

3,191,486
AUTOMATIC TORQUE INDICATING AND
APPLYING DEVICES
Roy P. Gibbens, Orlando, Fla., assignor to Martin-Marietta Corporation, Middle River, Md., a corporation of Maryland
Filed Oct. 29, 1962, Ser. No. 233,816
11 Claims. (Cl. 85—61)

This invention relates to automatic torque indicating and applying devices and more particularly to a torque device in the form of a nut having detachably connected thereon a torquing head, rotation of which threadably advances the nut along the shank of a corresponding bolt until a predetermined degree of tightness between the nut and bolt is obtained whereupon further rotation of the torquing head will not increase the tightness between the nut and bolt.

When tightening a nut upon a bolt it is frequently desirable to determine the amount of torque established when the nut and bolt are tightened down or to establish a predetermined amount of torque so as to tighten down the nut and bolt a desired amount and provide a desired pressure between the nut and bolt.

The prior are is replete with devices for indicating torque or applying desired stresses. Some of the more familiar types utilize either pilot holes in the bolt, torque indicating washers or means for determining the actual measurement of the stub and bolt elongation. Probably the most common torque indicating device is the well-known torque wrench.

In all of the foregoing techniques, there exists certain inherent deficiencies and disadvantages. By way of example, a severe tolerance problem presents itself in connection with the pilot hole methods whereas cost and time are serious factors regarding the torque indicating washer methods and the bolt and stud elongation methods. Insofar as the well-known torque wrench is concerned, variations in friction factors seriously affect the indicating accuracy of the wrench.

Another common method for indicating torque or applying stress forces comprises a coating of a brittle lacquer on one or more of the outer polygonal faces of the nut with the lacquer having the property of developing cracks under certain torques or stresses. As the nut and bolt are tightened together the brittle lacquer will ultimately shown cracks when the applied torque or stress reaches a certain general value. Though this latter torque indicating technique is satisfactory in many respects it also contains inherent disadvantages. By way of example, the accuracy of this method directly depends upon the quantity of lacquer used which factor is most difficult to control. In addition, inadvertent scratching, denting or marring of the lacquer considerably affects the torque value at which the lacquer will crack.

It is therefore a primary objects of the present invention to provide an automatic torque device which eliminates the necessity of visual indicators or the need for expensive equipment, devices or measuring instruments.

It is another object of the present invention to provide an automatic torque device in the form of a nut having detachably connected thereon a torquing head, which nut and head are constructed so that rotation of the head relative to the nut causes the nut to threadably advance along the shank of a corresponding bolt until a predetermined value of torque is applied, whereupon further rotation of the head relative to the nut will not increase the amount of torque applied.

Another object of the present invention is to provide an automatic torque device in the form of a nut having a torquing head detachably connected thereto by means of a shear pin, wherein the rotation of said head relative to said nut causes said nut to threadably advance along the shank of a corresponding bolt until a predetermined value of torque is applied so as to cause the shear pin to fracture, whereupon further rotation of the head relative to the nut will not increase the amount of torque applied.

Another object of the present invention is to provide a torque device of the type described which is fool-proof in use even when operated by a comparatively unskilled workman.

Another object of the present invention is to provide a torque device of the type described which can be manufactured in volume with a high degree of quality control so that any group of such devices will provide substantially the same predetermined torque indication when used.

Another object of the present invention is to provide a torque device of the type described which includes means for permitting the use of variable size shear pins to detachably connect the nut to the torquing head so that varying values of torque may be applied whereupon varying degrees of tightness between the nut and bolt can be achieved.

Another object of the present invention is to provide an automatic torque device of the type described which includes means for preventing inadvertent rotation of the nut by the wrench being used to rotate the torquing head.

Another object of the present invention is to provide an automatic torque device of the type described wherein the torquing head is in the form of a complete hand tool which can be detachably connected to the nut for tightening down the nut to the corresponding bolt with a desired value of tightness.

Another object of the present invention is to provide an automatic torque device of the type described wherein the torquing head is adapted to be used in combination with a standard rachet wrench.

Another object of the present invention is to provide an automatic torque device of the type described which includes means for preventing the torquing head from completely separating from the nut after the shear pin has fractured.

Another object of the present invention is to provide an automatic torque device of the type described wherein the axis of the shear pin may be disposed either parallel or perpendicular to the axis of the nut.

Another object of the present invention is to provide an automatic torque device of the type described wherein the nut is adapted for use with a conventional spanner wrench.

Another object of the present invention is to provide an automatic torque device of the type described which is simple in construction, economical to manufacture and highly reliable in performing the functions intended.

These and further objects and advantages of the invention will become more apparent upon reference to the following description and claims and the appended drawings wherein:

Figure 11A:
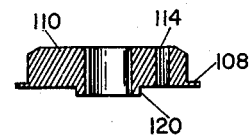
Figure 9:
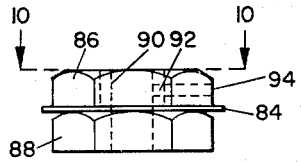
Figure 11:
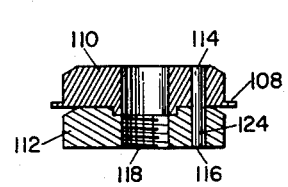
Figure 10:
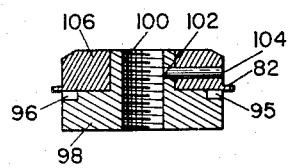
Figure 11B:
Figure 12:
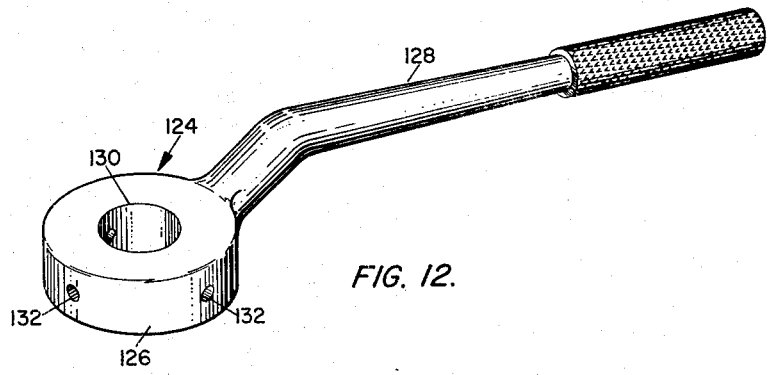
Figure 14:
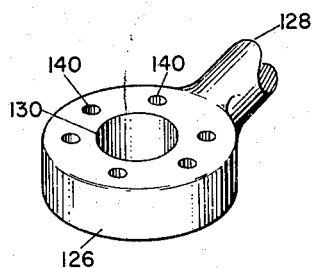
Figure 13:
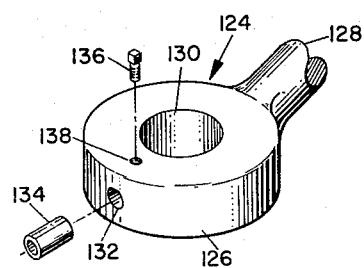
Figure 15:
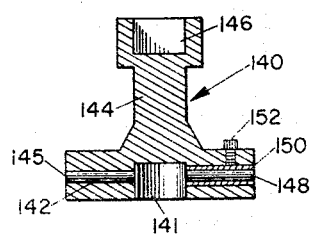
Figure 16:
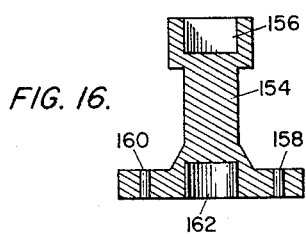

FIGURES 6–9 respectively depict four alternate embodiments of the present invention;

FIGURE 10 is a cross-sectional view of the fourth embodiment of the present invention taken along the lines 10—10 of FIGURE 9 but additionally includes means permitting the use of a conventional spanner wrench;

FIGURE 11 is another alternate embodiment of the present invention with the torquing head and nut shown separately in FIGURES 11a and 11b, respectively;

FIGURE 12–14 respectively depict three alternate embodiments of the torquing head of the present invention in the form of complete hand tools;

FIGURES 15–16 respectively depict two alternate embodiments of the torquing nut of the present invention adopted for use with a standard rachet wrench.

Referring specifically to FIGURES 1–5, wherein several views of a first embodiment of the present invention are shown, a nut, generally indicated at 10, has a torquing head, generally indicated at 12, releasably connected to it. The nut 10 (see FIGURE 2) comprises a lower hexagonal member 14, an upper cylindrical shank 16 and a central bore 18. The bore 18 is internally threaded for cooperation with an externally threaded corresponding bolt (not shown). The shank 16 has an opening 20 formed therein which extends through the wall 22 of the shank 16 and has an axis transverse to the axis of the bore 18.

The torquing head 12 comprises a hexagonal member 24, an opening 26 and a central bore 28. The opening 26 extends through the member 24 and has an axis transverse to the axis of the bore 28. The central bore 28 of head 12 is slightly larger than shank 22 of nut 10 so that the shank 22 may be inserted into the bore 28. The diameter of head 12 is smaller than the diameter of nut 10 for reasons to be discussed hereinafter.

A shear pin 30 is provided with a length large enough so that when it is inserted into openings 26 it extends also into opening 20. The ends 32 and 34 of pin 30 are preferably flush with the inner surface of shank 16 and the outer face of hexagonal member 24, respectively.

A description of the operation of the first embodiment of the present invention as depicted in FIGURES 1–5 is as follows: The head 12 is slid over the shank 16 of nut 10 until its lower face 36 is in close proximity to the upper face 35 of nut 10. The openings 20 and 26 are then aligned so that pin 30 can be inserted therein. It is preferable, of course, that the faces 35 and 36 of head 12 and nut 10 respectively, do not tightly engage each other, since additional friction factors would then be undesirably added. Thus, a minute space between faces 34 and 36 may be provided by constructing the height of opening 26 of head 12 slightly shorter than the height of opening 20 on shank 16 of nut 10. The bore 18 of nut 10 is then threadably engaged with the externally threaded shank of a corresponding bolt (not shown). A conventional wrench, such as a box end or open end wrench, is then utilized to engage the head 12 so as to cause rotation of both the head 12 and nut 10. It should be noted at this point, that when the head 12 is rotated, the nut 10 will also rotate as a result of the shear pin 30 in the openings 20 and 26. As the tightness between the nut 10 and its corresponding bolt increases, an increased torque is required in order to further rotate the nut 10. As will be apparent, the pin 30 will shear or fracture when the torque applied reaches a certain value. Thus, when fracture occurs, any further rotation of head 12 will not result in a corresponding rotation of nut 10. Accordingly, by properly selecting the size and material of shear pin 30, the point of fracture of pin 30 may be predetermined so that a desired value of tightness will exist between the nut 10 and its corresponding bolt. Therefore, when the pin 30 shears, not only is a desired tightness between the nut 10 and its corresponding bolt achieved but an automatic indication of the amount of torque applied is also provided. It will be apparent, therefore, that the mere rotation of head 12 uniquely provides both desired tightness and torque indication. It should also be noted at this time that head 12 is constructed with a diameter smaller than nut 10 for the purpose of preventing the wrench used to rotate head 12 from slipping down onto nut 10. Clearly, if nut 10 is driven instead of head 12, the shear pin 30 would never fracture and the desired value of tightness never achieved.

Figure 4:
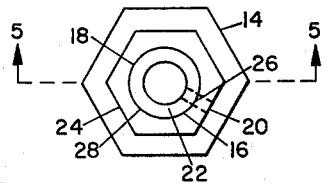
FIGURE 4 is a top view of the first embodiment of the present invention.
Figure 3:
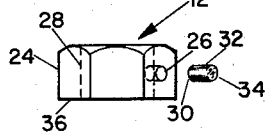
FIGURE 3 is a plan view of the torquing head of the first embodiment of the present invention.
Figure 1:
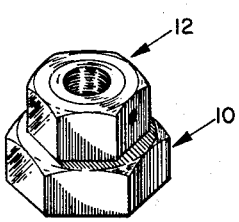
FIGURE 1 is an isometric view of a first embodiment of the present invention.
Figure 5:
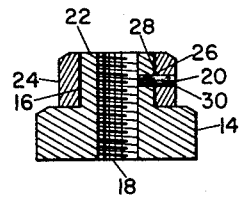
FIGURE 5 is a cross-section of the first embodiment of the present invention taken along the line 5—5 of FIGURE 4.
Figure 2:
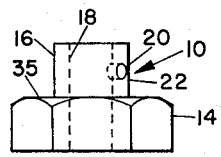
FIGURE 2 is a plan view of the nut of the first embodiment of the present invention.
Figure 6:
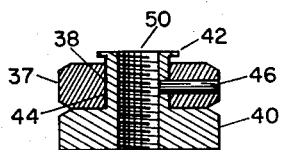

Referring now to FIGURE 6, there is shown a second embodiment of the present invention wherein a hexagonally shaped head 37 is prevented from completely separating from the shank 38 of a round shaped nut 40 by the flange 42. In this embodiment, the shank 38 is externally threaded as shown by the dark heavy line 44 so that when shear pin 46 fractures and head 37 is further rotated clockwise the head 36 will threadably advance up shank 38 until it abuts flange 42. It will be apparent that the inclusion of flange 42 and threads 44 provide the plural feature of (1) preventing head 37 from completely separating from nut 40, (2) permitting head 37 to be hand tightened against flange 42, for the purpose of preventing undesirable vibratory noises, and (3) permits removal of nut 40 by rotating head 37 counterclockwise so as to cause counterclockwise rotation of nut 40. It is to be understood that the threads 44 must be constructed in a direction opposite to the direction of internal threads 48 of the bore 50 so that when head 37 is hand-tightened in a clockwise direction the head 37 will advance toward the flange 42. It should also be noted that the diameters of head 37 and nut 40 are substantially equal. This construction of the nut may be utilized when a round nut is used rather than a hexagonal nut, such as nut 10 of FIGURES 1–5.

Figure 7:
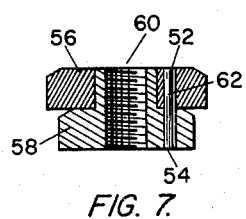

Referring now to FIGURE 7, there is shown a third embodiment of the present invention wherein the openings 52 and 54 of torquing head 56 and nut 58, respectively, are co-axial with the bore 60. This arrangement of the present invention uniquely permits top loading of the shear pin 62 and provides an advantageous feature regarding space requirements or the like. It should also be noted that the head 56 has a diameter larger than the diameter of nut 58. This latter feature prevents undesirable engagement of the wrench used to rotate head 56 with the nut 58. Although nut 58 in this embodiment is hexagonally shaped, it will be apparent that it can be round shaped as well.

Figure 8:
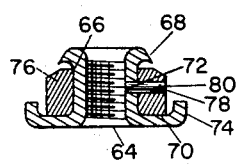

FIGURE 8 depicts a fourth embodiment of the present invention wherein the nut 64 is made from standard sheet metal. In this embodiment the nut 64 comprises an internally threaded center portion 66, an enlarged rim portion 68 and a transversely extending face portion 70. The center portion 66 has an opening 72 formed therein, and the face portion 70 has its periphery 74 bent toward the opening 72 in a substantially parallel relationship to center portion 66. The torquing head 76 is positioned about the center portion 66 and has an opening 78 formed therein. A shear pin 80 is inserted into openings 72 and 78 so as to releasably connect head 76 to nut 64. Thus, when shear pin 80 fractures, the head will rotate about nut 64 without causing increased tightening of the nut and its corresponding bolt (not shown). The rim portion 68 prevents head 76 from completely separating from the nut 64.

Referring now to FIGURE 9, there is shown a fifth embodiment of the present invention, wherein a flange 84 is provided on the head 86 for preventing the wrench being used to rotate the head 86 from engaging the nut 88. The internally threaded bore 90 of the nut 88 and the openings 92 and 94 of the nut 88 and head 86, respectively, are substantially the same as that described above with regard to FIGURES 1–5. Alternatively, of course, a conventional washer may be used in lieu of the flange 84 for preventing undesirable rotation of nut 88.

FIGURE 10 is a cross-sectional view of a sixth embodiment of the present invention taken along the lines 10—10 of FIGURE 9, but further includes: (1) cut-away portions or openings 95 and 96 in the nut 98 for permitting the use of a conventional spanner wrench for subsequent removal of the nut 98, and (2) a round-shaped nut 98 as contrasted to the hexagonally shaped nut 88 of FIGURE 9. It should be noted, that since the spanner wrench feature has been incorporated in the embodiment of FIGURE 10, it is not necessary to shape the nut 98 for use with conventional wrenches. Further, the internally threaded bore 100 of nut 98 and the openings 102 and 104 of the nut 98 and head 106, respectively, are also substantially the same as that above described with regard to FIGURES 1–5.

Referring now to FIGURES 11, 11a and 11b, there is shown a seventh embodiment of the present invention wherein (1) a peripheral flange 108 similar to the flange 84 of the embodiment of FIGURE 9 is provided on the head 110 for preventing the wrench being used to rotate the head 110 from engaging the nut 112, and (2) openings 114 and 116 of head 110 and nut 112, respectively, are formed coaxially with the bore 118 of nut 112 for the purpose of providing a top loading feature. The head 110 (see FIGURE 11a) also includes a circular hub 120 which seats into the circular cutaway portion 122 of the nut 112 (see FIGURE 11b). Thus, when the shear pin 124 fractures, the head 110 will rotate relative to the nut 112 with the hub 120 rotatably engaging the peripheral walls of the opening 122. It will be noted, therefore, that the subsequent rotation of the head 110 relative to the nut 112 after the shear pin 124 fractures, will not increase the tightness between the nut 112 and its corresponding bolt (not shown). In this embodiment of the present invention, the nut 112 and head 110 are preferably hexagonally shaped, though other polygonal shapes may be used instead. It will be apparent that the peripheral hub 120 in cooperation with the opening 122 and the coaxial openings 114 and 116 of the head 110 and nut 112, respectively, uniquely provide automatic torque indication without the necessity of a shank extending from the nut 112 such as shank 16 of the embodiment depicted in FIGURES 1–5.

Referring now to FIGURE 12, there is shown a complete hand tool, generally indicated at 124, which may be used in lieu of the head 12 above described with regard to FIGURES 1–5. The tool 124 comprises a donut shaped head 126 and a handle 128, which is conventionally connnected to head 126. The head 126 is a parallel section of a solid rod with a central bore 130 and a plurality of transverse openings 132 provided. For purposes of clarity and understanding the use of tool 124 will be discussed in conjunction with the nut 10 of FIGURES 1–5. In operation, the tool 124 is placed around the shank 16 of nut 10 with one of the openings 132 aligned with the opening 26 of nut 10. The shear pin 30 is then inserted into the aligned openings and the handle rotated until the pin fractures. Clearly, any further rotation of handle 128 will not cause a corresponding rotation of nut 10. It will be apparent, although any one of the openings 132 of tool 124 may be aligned with the opening 20 of nut 10 the nut 10 may be constructed with several openings similar to opening 20, and in alignment with the openings of 132 of tool 124. Thus, by utilizing several shear pins various values of torque can be automatically indicated or applied. In addition, shear pins having different shear values can be used for further varying the value of torque indicated or applied. Further, openings 132 may be of variable size so that different size shear pins may be used for further varying the value of torque indicated or applied.

In FIGURE 13, there is shown an additional feature which may be incorporated into the tool 124. This feature comprises a sleeve 134 and a set screw 136. The sleeve 134 is inserted into the opening 132 and locked into position by the set screw 132 which threadably engages an internally threaded opening 138. Opening 138 extends transverse to and into opening 132. When sleeve 134 is utilized, a smaller diameter shear pin may be used when torquing down the nut 10. Thus, a varying degree of automatic torque indication or application can be achieved by merely inserting variable size sleeves. It should be understood, of course, that the insertable sleeve feature of FIGURE 13 may be utilized in combination with the plurality of openings feature of FIGURE 12 or in lieu thereof. In addition, the torque device of any embodiment of the present invention may be constructed so as to include (1) the plurality of openings feature, (2) the insertable sleeve feature, or (3) the variable size plural opening feature or any combination of these features if so desired.

FIGURE 14 merely depicts a complete tool similar in most respects to the tool of FIGURE 12, but providing openings 140 co-axially with central bore 130. Clearly, this tool would be used in combination with a nut similar to the one shown in FIGURE 7.

Referring now to FIGURE 15, there is shown a torquing head, generally indicated at 140, constructed for use with on conventional rachet wrench (not shown). The head 140 comprises (1) a round shaped base 142, (2) a neck portion 144 and (3) a socket connector 146. The base 142 comprises a central bore 141, a first opening 146 and a second opening 148. The opening 148 is adapted to receive a sleeve 150 which is held in position by set screw 152. The axes of openings 146 and 148 are transverse to the axis of bore 141. The socket 146 is a conventional female connector which is adapted to cooperate with the male connector of a conventional rachet wrench. It is to be understood that variable size sleeves may be inserted in opening 148 for providing variable torque indication or application. Also, a shear pin may be inserted either in the opening 145 or in the opening 148 or both depending upon the value of tightness between the nut and bolt that is desired.

FIGURE 16 shows a second embodiment of a torquing head which is adapted for use with a conventional ratchet wrench. The neck 154 and connector 156 are substantially the same as neck 144 and connector 146 of FIGURE 15, respectively. However, openings 158 and 160 are constructed co-axially with respect to bore 162 so as to provide a top loading feature.

In view of the foregoing, it will be apparent that the present invention uniquely provides automatic torque indication or application without the undesirable necessity of visual indicators or expensive equipment, devices or measuring instruments. The use of a nut having a detachably connected torquing head thereon which when rotated relative to the nut causes the nut to threadably advance along the shank of a corresponding bolt until a predetermined value of torque is applied and which when further rotated relative to the nut will not increase the amount of torque applied unequivocally provides an automatic torque device which is foolproof in use even when operated by a relatively unskilled workman. In addition, the use of (1) different size torquing heads and nuts, (2) round shaped nuts or (3) flanges on the torquing head, advantageously prevent undesirable subsequent rotation of the nut after a desired pressure between the nut and its corresponding bolt has been achieved. Further, the use of (1) shear pins of variable size and material, (2) a plurality of shear pins or (3) variable size insertable sleeves, advantageously provide a variable degree of torque indication or provide a variable amount of torque application so as to establish a desired pressure between the nut and its corresponding bolt.

It is thus further seen that the automatic torque devices of the present invention achieve unique simplicity in construction, are economical to manufacture and highly reliable in performing the desired objects and intended functions.

While several embodiments of the present invention have been described in detail, it is to be understood that other modifications are contemplated which would be apparent to persons skilled in the art without departing from the spirit of the invention or the scope of the appended claims.

I claim:
1. An automatic torque device for indicating and applying a predetermined value of torque to a nut and bolt arrangement comprising, in combination:
   (a) an internally threaded nut adapted to be threadably connected to a corresponding bolt, said nut comprising a base, a cylindrical shank integrally connected to said base, an internally threaded bore extending through said base and shank, and a single opening in said shank having an axis transverse to the axis of said threaded bore;
   (b) an internally bored head releasably connected to said shank of said nut, said head comprising a circular central bore extending through said head and a single opening having an axis transverse to the axis of said central bore and co-axially positionable with said opening in said shank;
   (c) said head being co-axially positioned about said shank so that said central bore slidably engages said shank of said nut thereby slidably holding said head in relative position about said shank so as to guide said nut in a predetermined circular path about the axis of rotation of said torque device when said head is rotated;
   (d) sleeve means positioned within said opening within said head for adapting the head to receive a shear pin having a diameter smaller than the said openings in said head and nut;
   (e) an elongated shear pin partially positioned within said sleeve means in said shank and partially positioned within said opening in said head so that any rotation of said head about its axis causes a corresponding rotation of said nut about its axis so as to cause said nut to threadably advance along its corresponding bolt until a predetermined torque is applied, whereupon said shear pin fractures and said head separates from said nut so that any subsequent rotation of said head will not cause a corresponding rotation of said nut; and
   (f) means for releasably securing said sleeve means within said opening within said head, whereby said sleeve means may be removed and replaced with sleeves having variable inner diameters so that variable size shear pins may be utilized to provide a variable torque selection.
2. An automatic torque device in accordance with claim 1 and further including:
   (a) flange means associated with said shank for preventing said head from completely separating from said nut.
3. An automatic torque device in accordance with claim 1, wherein:
   (a) said nut is constructed from sheet metal stock.
4. An automatic torque device in accordance with claim 1, wherein:
   (a) said head includes handle means integrally connected therewith for rotating said head.
5. An automatic torque device in accordance with claim 1, wherein:
   (a) said head includes socket means integrally connected therewith so that said head may be rotated by a conventional ratchet.
6. An automatic torque device in accordance with claim 1, wherein:
   (a) said head and nut have equal diameters; and
   (b) said head includes a peripheral flange for preventing engagement of said nut by the means used to rotate said head.
7. An automatic torque device in accordance with claim 1, wherein:
   (a) said nut includes notches for subsequently removing said nut from its corresponding bolt with a conventional spanner wrench.
8. An automatic torque device for indicating and applying a predetermined value of torque to a nut and bolt arrangement comprising, in combination:
   (a) an internally threaded nut adapted to be threadably connected to a corresponding bolt, said nut comprising a base, a cylindrical shank integrally connected to said base, an internally threaded bore extending through said base and shank, and a single opening in said base having an axis parallel to the axis of said threaded bore;
   (b) an internally bored head releasably connected to said base of said nut, said head comprising a circular central bore extending through said head and a single opening having an axis parallel to the axis of said central bore and co-axially positionable with said opening in said base;
   (c) said head being coaxially positioned about said shank so that said central bore slidably engages said shank of said nut thereby slidably holding said head in relative position about said shank so as to guide said nut in a predetermined circular path about the axis of rotation of said torque device when said head is rotated;
   (d) sleeve means positioned within said opening within said head for adapting the head to receive a shear pin having a diameter smaller than the said openings in said head and nut;
   (e) an elongated shear pin partially positioned within said sleeve means in said base and partially positioned within said opening in said head so that any rotation of said head about its axis causes a corresponding rotation of said nut about its axis so as to cause said nut to threadably advance along its corresponding bolt until a predetermined torque is applied, whereupon said shear pin fractures and said head separates from said nut so that any subsequent rotation of said head will not cause a corresponding rotation of said nut; and
   (f) means for reelasably securing said sleeve means within said opening within said head, whereby said sleeve means may be removed and replaced with sleeves having variable inner diameters so that variable size shear pins may be utilized to provide a variable torque selection.
9. An automatic torque device in accordance with claim 8, wherein:
   (a) said head has a diameter larger than the diameter of said nut; and
   (b) said nut includes notches for subsequently removing said nut from its corresponding bolt with a conventional spanner wrench.
10. An automatic torque device in accordance with claim 8, wherein:
    (a) said head includes handle means integrally connected for rotating said head.
11. An automatic torque device in accordance with claim 8, wherein:
    (a) said head includes socket means integrally connected therewith so that said head may be rotated by a conventional ratchet.

References Cited by the Examiner
UNITED STATES PATENTS

| 881,075 | 3/08 | Hosking | 81—52.4 |
|---|---|---|---|
| 1,763,021 | 6/30 | Turner | 85—32 |
| 1,889,571 | 11/32 | Redinger | 279—99 |
| 1,966,414 | 7/34 | Main | 85—32 |
| 2,061,718 | 11/36 | Stahl | 85—32 |
| 3,027,796 | 4/62 | Shewmon | 85—61 |

FOREIGN PATENTS 324,581    1/30    Great Britain.

EDWARD C. ALLEN, *Primary Examiner.*